Patented Dec. 19, 1922.

1,439,053

UNITED STATES PATENT OFFICE.

CLIFFORD F. ARMITAGE AND FREDERICK H. HOLMES, OF NEWARK, NEW JERSEY, AND BYRON C. BERRY, OF NEW YORK, N. Y.

COMPOSITION OF MATTER FOR USE AS PAINT OR STAIN AND INSECT AND VERMIN REPELLENT.

No Drawing.   Application filed July 10, 1922.   Serial No. 574,069.

*To all whom it may concern:*

Be it known that we, CLIFFORD F. ARMITAGE, residing at 41 Lehigh Avenue, Newark, in the county of Essex and State of New Jersey, FREDERICK H. HOLMES, residing at 229 Mt. Pleasant Avenue, Newark, in the county of Essex and State of New Jersey, and BYRON C. BERRY, residing at 2343 Morris Avenue, in the county of Bronx, State of New York, and all being citizens of the United States, have invented a new and useful Composition of Matter for Use as Paint or Stain and Insect and Vermin Repellent, of which the following is a specification.

Our composition consists of the following ingredients, combined in the proportions stated, viz:—

| | Parts. |
|---|---|
| Oil of cedar leaf | 1 |
| Oil of cedar wood | 9 |
| Paraffin | 1 |
| Coloring matter (any desired tint) | ½ |

These ingredients are to be thoroughly mingled by agitation.

In using the above named composition, the surface, either inner or outer, or both, of the object from which it is desired to repel insects or vermin, is stained or coated with this composition. The composition may be produced by the use of the aforesaid ingredients in liquid, paste, jelly or powder form.

By the use of the above composition, the surface of the object, or of the container of the objects desired to be protected from attack by insects or vermin, is rendered obnoxious and repellent to them. So, the aroma of our composition when applied to plaster, wood or any other type of surface, repels insects and vermin from invading clothes closets, trunks, drawers or boxes and from attacking walls.

We claim:—

1. The herein described composition of matter, consisting of oil of cedar leaf, oil of cedar wood, paraffin and coloring matter, substantially as described.

2. The herein described composition of matter for repelling insects and vermin, consisting of oil of cedar leaf, 1 part, oil of cedar wood, 9 parts, paraffin 1 part, and coloring matter ½ part, substantially as described.

3. As a new product of manufacture, a surface coating composition containing oil of cedar leaf, oil of cedar wood and paraffin, substantially as described.

4. As a new product of manufacture, a surface coating composition containing oil of cedar leaf, oil of cedar wood, paraffin and coloring matter substantially as described.

5. As a new product of manufacture, a surface coating composition containing oil of cedar leaf, 1 part, oil of cedar wood, 9 parts, paraffin, 1 part, and coloring matter, ½ part.

CLIFFORD F. ARMITAGE.
FREDERICK H. HOLMES.
BYRON C. BERRY.

Witnesses:
M. E. SERLING,
H. A. SCHILLER.